Figure 1:
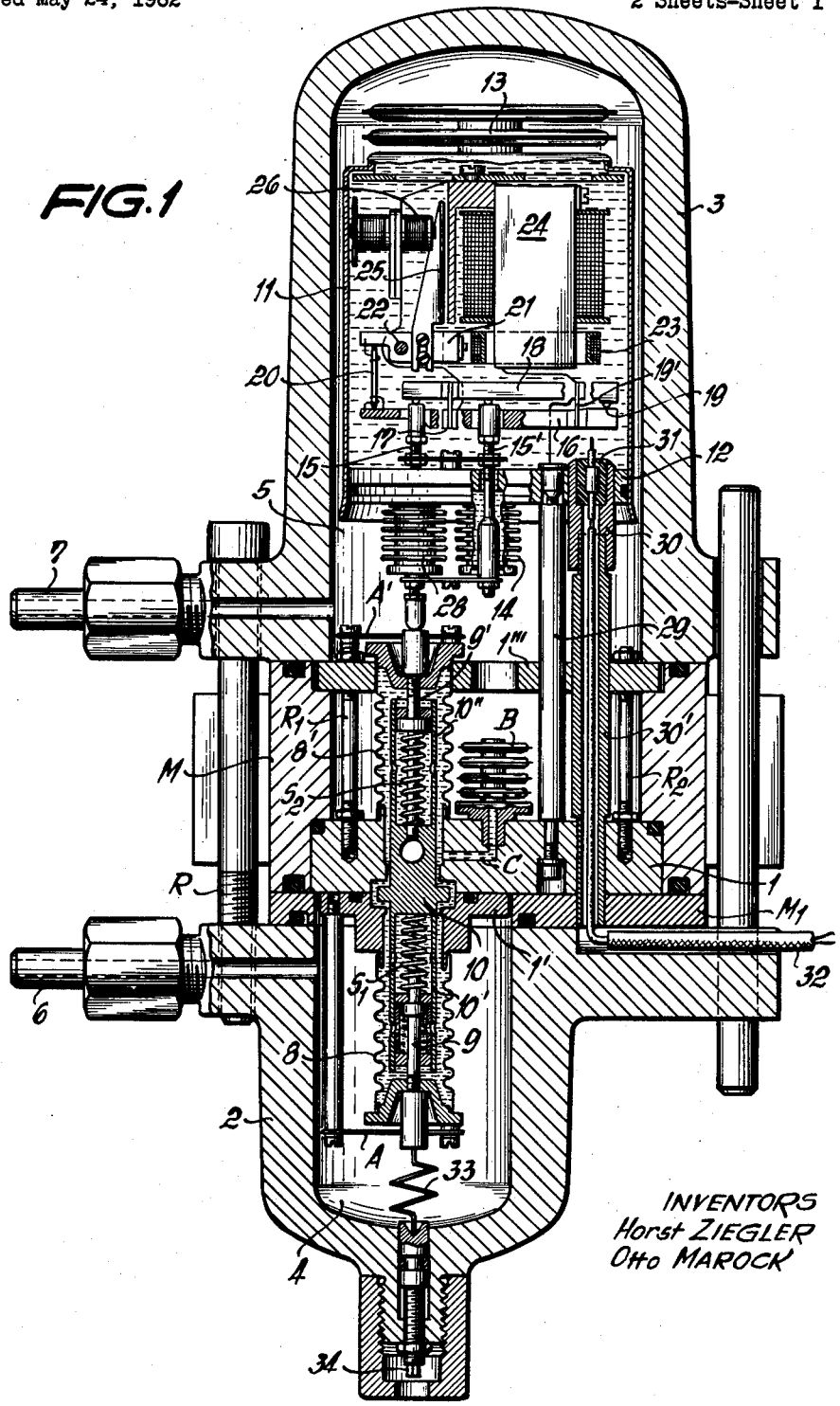

July 27, 1965 H. ZIEGLER ETAL 3,196,663
ELECTRICAL DIFFERENTIAL-PRESSURE METER
Filed May 24, 1962 2 Sheets-Sheet 1

INVENTORS
Horst ZIEGLER
Otto MAROCK

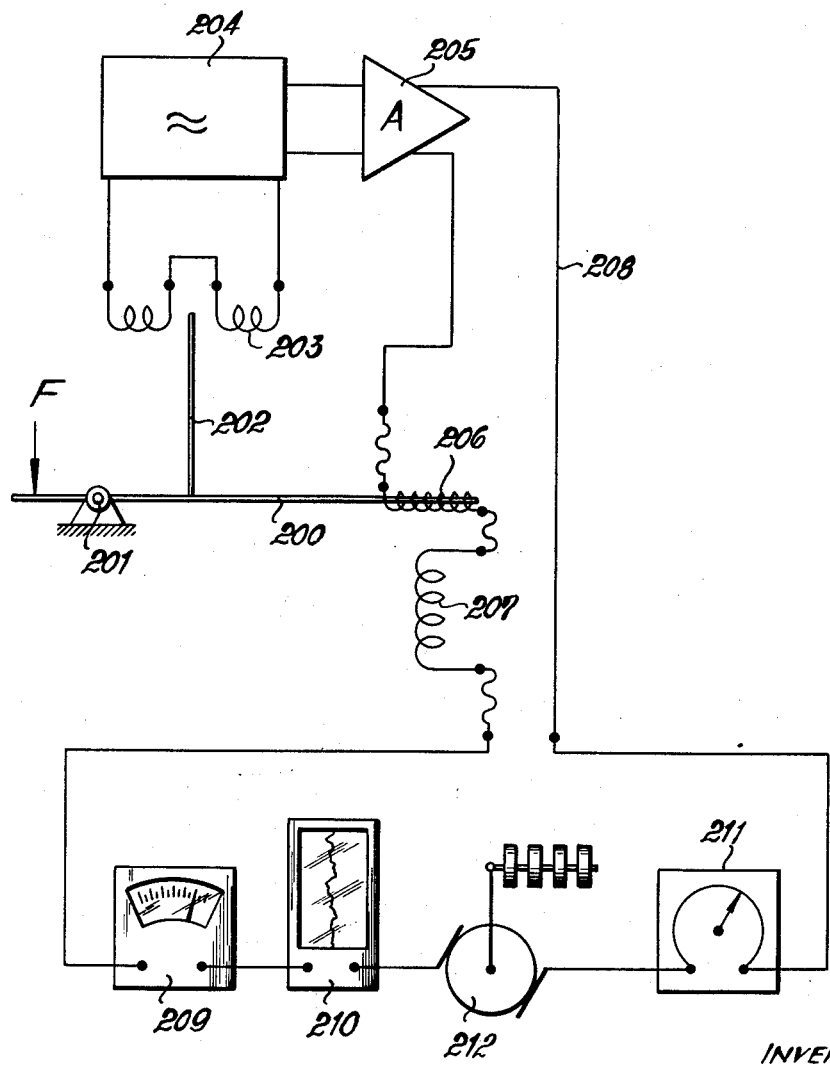

United States Patent Office 3,196,663
Patented July 27, 1965

3,196,663
ELECTRICAL DIFFERENTIAL-PRESSURE METER
Horst Ziegler, Berlin-Charlottenburg, and Otto Marock, Berlin-Friedenau, Germany, assignors to Continental Elektroindustrie Aktiengesellschaft, Askania-Werke, Berlin-Mariendorf, a corporation of Germany
Filed May 24, 1962, Ser. No. 197,341
Claims priority, application Germany, May 26, 1961, C 24,206
9 Claims. (Cl. 73—398)

The present invention relates to an electrical differential-pressure meter comprising a mechanical differential-pressure measuring device with two pressure chambers, separated by a partition, such as a diaphragm, which is displaceable under the influence of the pressure difference between the two chambers. The device further comprises an electro-mechanical force compensator for transforming a force corresponding to the differential pressure into an electrical quantity, such as a direct current. This transformation involves converting the force into a corresponding displacement of a meter element which is moveable, preferably in balance-like fashion, observing the resulting displacement of this element by means of an electrical position detector, and conducting via this detector an electrical current to a source of electro-magnetic force which coacts with the meter element to produce a force opposing the action of the force being metered.

One known problem in such differential-pressure meters is that of transferring the force to be metered, which is produced in the interior of a pressure chamber, to the displaceably mounted meter element as an initial step in compensating for that force. Numerous devices are known in which this force produced inside the pressure chamber is transferred to the outside via elastic couplings in response to rotation of the meter element. In such devices the components of the electro-mechanical compensator are located outside the pressure chamber.

Among the applications for which compensators of this type are unsuitable is that of measuring the volume of fluid flow in high pressure pipelines. The reason for this is that elastic through-the-wall couplings are not suitable for high static pressures. Therefore magnetic couplings have been used in place of mechanical couplings for making volume measurements in high-pressure steam lines by the effective pressure method. In addition to requiring careful adjustment, magnetic couplings can transfer only limited forces. Consequently this type of differential-pressure meter frequently requires lever linkages within the pressure chamber, which are both complicated and subject to corrosion.

Therefore differential-pressure meters have also been built which dispensed entirely with means for transferring the force to be metered outwardly through the wall of the meter housing whose interior is under high static pressure. In these known arrangements certain portions of the compensator are structurally joined to the meter element in such a way that those elements of the compensator which cooperate most intimately with the meter element are located at least partially inside the differential-pressure meter.

In such arrangements the force to be measured, which corresponds to the differential pressure, is compensated right inside the meter housing, so that only electrical connections need to be brought out through the housing walls via pressure-tight glands. For example, differential-pressure meters are known in which the position detector and the compensating force productive means are separated and positioned, respectively, on the high-pressure and low-pressure sides of a diaphragm. The movable parts of these elements are then attached directly to the diaphragm. This kind of arrangement has the drawback that its high susceptibility to corrosion makes it impossible to use it with chemically active substances.

In differential-pressure meters employing dual Sylphons or bellows it is known to position the position detector, the force producer and the meter element of the compensator inside the two bellows, which are rigidly joined by an internal lever and subjected from the outside to the pressures to be measured. The interior of the bellows is completely filled with an incompressible protective fluid, such as oil. The pressure difference representative force is therefore compensated inside the two bellows. In this kind of arrangement the susceptibility of the device to corrosion is eliminated. However this arrangement is not useable "as is" in some cases, such as in simple differential-pressure meters employing a diaphragm or in those employing an inverted bell in which the two pressure chambers are separated by a barrier liquid containing a float which experiences a lift that varies with pressure difference. Accordingly, for each of these, as well as many other special types of meters, individual adaptations must be made which again are equipped with elastic, or magnetic force transmissive means.

Finally, differential-pressure meters employing diaphragms are known in which the meter element, the position detector, and the force producing means are located in an oil filled housing, whose wall is provided with two elastic diaphragms whose outer surfaces are exposed to the pressure of the low-pressure side of the meter diaphragm. The diaphragm produced force to be measured is transferred within the pressure chamber to one of the two diaphragms of the compensator housing, that one diaphragm being rigidly coupled to the meter diaphragm. A pressure corresponding to the force to be measured is transmitted hydraulically, via the oil which fills the compensator housing, to the other of the elastic diaphragms and thence by means of a lever to the meter element of the compensator. Thus the resultant force is compensated in the usual manner. This arrangement is also safe from corrosion of the compensator parts. However it has the drawback of extraordinary temperature sensitivity due to the fact that the oil which fills the container is relied on to transmit the force to be measured to the pressure measuring system formed by the elastic diaphragms in conjunction with the protective liquid enclosed between them. This sensitivity is due primarily to the fact that thermally caused changes in volume of the protective liquid produce forces upon the diaphragm which are superposed on the force to be measured transferred by means of said liquid. This causes errors in measurement. Because of the high coefficients of thermal expansion of liquids such arrangements are especially unsuitable when the meter is intended for measuring the flow of hot media, e.g. for steam volume measurements in power plants.

Accordingly, it is an object of the invention to provide a differential-pressure meter which is substantially free from one or more of the above-mentioned shortcomings characterizing known meters.

These and other objects which will appear are achieved in accordance with the invention by providing an arrangement of the type first discussed above and having the following features:

(a) The meter element, position detector and compensating force producing means are enclosed in a housing filled with protective fluid, (b) The compensator housing is demountably fastened to the differential-pressure meter element, (c) The liquid which fills the compensator housing is exposed to the pressure in one of the pressure chambers via a flexible wall in the chamber, this wall having the characteristic that when it is flexed it exerts, at most, a weak flexure-opposing force, and preferably none at all, and (d) The force corresponding to the pressure difference is transferred mechanically from inside the meter pressure chamber into the compensator housing of the meter element, this transfer being accomplished via rods, levers, or the like, as well as by means of an elastic housing wall segment which also exerts at most a weak flexure-opposing force, the mechanical translating elements inside the chamber as well as these inside the housing being in force-communicating relation with each other via said housing wall segment.

Preferably the invention is embodied in a form in which the compensator parts enclosed within the housing filled with protective liquid are placed, together with their housing, entirely inside the two pressure chambers of the differential-pressure meter. It is desirable to dispose the housing on the low-pressure side of the differential-pressure meter.

The invention provides an electrical differential pressure metering arrangement which overcomes the defects of those described above. Moreover the form of the compensator is now completely independent of the particular form which any given differential-pressure meter may take. It is also possible to use the compensator with any meter movement, i.e. to combine it with any desired movement, without having to modify the construction of either the compensator or the meter movement. In addition the invention affords the advantage that, in case of breakdown, the compensator can be readily displaced with a similar unit. This simplifies the maintenance of the pressure meter. Testing and calibration of the entire assembly are simplified since meter movement and compensator do not form an integral structure. This is clearly advantageous for the mass production of such instruments.

For further details reference may be had to the accompanying drawings wherein:

FIGURE 1 shows a schematic cross-section of a preferred embodiment of a square root taking electrical differential-pressure meter suitable for measuring rate of flow in a high pressure steam line by the effective presure head method; and FIGURE 2 illustrates the electrical operation of the above-mentioned structure.

Referring first to FIGURE 2, reference numeral 200 designates a first-class lever pivoted about fulcrum 201 and acted on by a force F, which is the force to be measured. This force corresponds to the pressure difference $\Delta p$ existing at an orifice in a pipeline. The change in position of lever 200 which is produced by this force is electrically sensed by means of electrical position detectors 202, 203, 204 and rectified into a unidirectional current which appears at the output of amplifier 205. The position detector consists in this instance of a metal vane 202, rigidly joined to lever 200, which varies the inductance of coil 203 forming part of the feedback loop of an electrical oscillator 204 by an amount dependent on the position of lever 200. Oscillator 204 co-operates with amplifier 205. The unidirectional current which is produced at the amplifier output is supplied to two series-connected coils 206, 207. Together these coils form an electro-magnetic actuator. Coil 206 is rigidly joined to lever 200 and moves together with this lever relative to the field of stationary coil 207. By means of this actuator 206, 207 a turning moment is applied to lever 200 which opposes the turning moment produced by force F. It is proportional to the square of the unidirectional compensating current. When the two forces thus applied to the lever 200 are balanced the turning moment produced by the compensating actuator equals the force to be measured. The compensator current of the device is therefore proportional to the square root of that force. If the force to be measured corresponds to a pressure difference being metered, then the current is a direct measure of the flow Q of a medium traversing a pipe line, since Q is proportional to $\sqrt{\Delta p}$. Connected in series with the coils of the compensator actuator in the usual way are measuring instruments, or regulators. These may comprise an indicator 209, a recorder 210, a direct current ammeter 211 and the input 212 to an electrical regulator. All instruments are connected in series in line 208. The current flowing through line 208 is independent from changes in the resistance loading the output of amplifier 205.

Referring now to FIGURE 1, reference numeral 1 in that figure designates a base plate of the mechanical portions of the differential pressure meter. The numerals 2 and 3 designate two domes, whose interiors 4 and 5 respectively constitute the high and low pressure sides of the differential-pressure meter. The interiors 4 and 5 of the two domes communicate with the corresponding pressure ports of the pipe line in which the flow is to be measured by a differential-pressure technique utilizing an orifice built into the line in a usual known manner. This communication takes place via conduits 6 and 7. Inside high pressure chamber 4 a Sylphon or bellows 8 is fixed to an intermediate plate 1' which is fastened to base plate 1 by screws (not shown). The interior of the bellows communicates via a passage in the base plate 1 and plate 1' with the interior of a second Sylphon or bellows 8' disposed on the low pressure side 5 of the base plate. Both bellows are filled with an incompressible protective liquid. In the passage between the interior of the two bellows a displacement-limiting member 10 is located. It shows two hollow and cylinder shaped members 10' and 10'', which are rigidly secured to member 10. The interiors of the members 10' and 10'' receive the springs $S_1$ and $S_2$ respectively. The springs are acting against member 10. Two rods 9 and 9' are fixed to the heads of bellows 8 and 8'. They slide in the interior of members 10' and 10'' and act against the springs and, therefore, against member 10.

The system described provides a safety mechanism which prevents destruction of bellows 8 and 8' when influenced by an excessive increase of pressure either in chamber 4 or in chamber 5. In case of such pressure conditions member 10 stops the flow of fluid through the passage in base 1. Suitable valve means (not shown) for exactly stopping any flow are provided on member 10, which coacts in this instance with its surrounding walls of plate 1' and base 1.

A conduit C in base 1 connects the interior of a bellows B (positioned at the low pressure side of the meter) with the interior of bellows 8 and 8'. The member B is a soft or slack one with no or little elastic properties. It acts to transduce the pressure on the low pressure side of the meter to the liquid filling the interior of bellows 8, 8' and B. As a consequence a force proportional to the pressure difference between chambers 4 and 5 is acting on the head of bellows 8. This force is to be measured by the compensating means described below.

For a complete description it should be noted, that the domes 2 and 3 abut a ring shaped cylindrical member M. The domes are pressed against this member by a number of screws R arranged circumferentially around the longitudinal axis of the meter. The member $M_1$ is located between member M and dome 2. All parts are connected in pressure-tight fashion.

The head of bellows 8' slides without contacting in an opening in a plate 1'''. The plate is secured over a seat to member M by screws $R_1$ and $R_2$. The screws draw plate 1''' towards base 1. By means of said screws the base is pressed simultaneously against member M whereby plate 1''' and base 1 are secured to this member.

Furthermore the bellows 8 and 8' are guided in their longitudinal direction. For guiding of the bellows two weak leaf springs or ring shaped weak membranes A and A' are provided. The springs or membranes are fastened to the heads of the bellows 8 and 8′ and to rods which are secured with plate 1′ and with base 1 respectively as clearly shown in the drawing.

Reference numeral 11 designates a dome-shaped housing located inside low pressure chamber 5. This housing 11 is attached in pressure-tight fashion to mounting plate 12. Housing 11, 12 is filled with a protective liquid, which may take the form of a silicon oil, and is equipped with a flexible wall 13. This wall consists of a slack bellows which is exposed on one side to the liquid in housing 11, 12 and on the other side to the pressure chamber 5. By means of the flexible housing wall 13 the pressures in chamber 5 and the interior of housing 11, 12 are equalized.

There is therefore no appreciable pressure difference between the interior of the housing and pressure chamber 5. Any pressure difference which does exist is due solely to undesired properties of the material forming housing wall 13 and possible thermal effects in the liquid confined within housing 11, 12.

Base plate 12 also has a bellows 28 attached to it, this bellows being made of a material exhibiting properties similar to those of housing wall 13 or bellows B, i.e. exerting essentially no flexure-opposing force. The end wall of this bellows is rigidly connected to a rod 15 which extends through the bellows 28, bearing on a first-class lever 18, immersed in the protective liquid and pivoted about fulcrum 17. Fulcrum 17 is a leaf spring attached to a mounting fixed to plate 12. On the other hand the rod 9′, which is acted on by a force corresponding to any pressure difference between chambers 4 and 5, also transmits that force to the end plate of bellows 28. As a result the force transmitted via rod 15 to lever 18 corresponds to the force to be measured.

A second first-class lever 16 is pivoted on spring fulcrum 19′, also attached to the mounting mentioned above. This lever serves to reduce the force being measured. The reduced force is transferred via rod 20 and contact 19 to the meter movement of the electro-mechanical compensator. This meter movement consists of a third first-class lever 21 pivoted about axis 22. Lever 21 supports the movable coil 23 of an electro-dynamic actuator 23, 24, which is similar in form to an electromagnet and consists of a stationary coil 24 and a coil 23 movable relative to the field of coil 24. Lever 21 is also rigidly connected to a metal vane 25, made of copper, for example, which lies in the field of a coil 26 forming part of the feedback loop of a high frequency oscillator. Lever 21 rotates about axis 22 by an amount determined by the force to be measured acting upon connecting rod 9′, thereby varying the inductance of coil 26. This causes the production, in the electronic part of the electro-mechanical compensator located outside the mechanical meter movement (which may be of the form previously described in connection with FIGURE 2), of a current which is supplied to the electro-dynamic actuator 23, 24 with such polarity as to produce a compensating force opposing the force being measured. Thus the forces applied to lever 21, which forces consist of the force to be measured and the opposing compensating force, are always balanced.

From the electronic portion of the electro-mechanical compensator there can be readily derived a characteristic direct current, alternating current or other electrical quantity, e.g. a signal of characteristic frequency, which can in known manner be made directly proportional either to the force being measured or to the square root of that force.

The vane 25 or another separate vane made of aluminium for example is attached to lever 21 and serves also to damp out movements of the electro-mechanical compensator in the liquid enclosed inside housing 11, 12.

A pressure difference existing between the interior of compensator housing 11, 12 and pressure chamber 5 would cause a force to act on the end plate of bellows 14. This force would be superposed on the force acting on rod 9 which it is desired to measure and would therefore introduce an error into the measurement. Such forces would arise if the only possible expansion of the protective liquid due to temperature changes were against an appreciable opposing force produced by partition 13. The measurement would also be subject to error-inducing forces if pressure on the end of bellows 28 were to cause a pressure rise within housing 11, 12 or if displacement of the protective liquid against the pressure of chamber 5 required the expenditure of energy. Apparatus in accordance with this invention is free from these disturbing influences upon the functioning of the meter.

To establish an electrical connection between the electro-mechanical components of the compensator located inside housing 11, 12 and the electronic components of the device, the base plate 12 is equipped with a nipple-shaped protrusion 30 which provides a pressure-tight passage for the electrical connection into the interior of the meter housing. Nipple 30 receives the conductors which are bundled into a cable 32. In the interior 31 of nipple 30 the conductors are stripped of their insulation and, if desired, soldered into individual ducts. The metallic conductors are spaced from each other inside nipple 30.

The interior 31 of nipple 30 is poured full of a metal bonding material, e.g. a plastic metal bonding material, so that a solid insulating bond is formed between the nipple 30 and the metallic conductors. Such a lead-through has proven to be exceptionally pressure-tight, even forces of several tons being unable to disrupt it. Once inside the protective liquid, the conductors are again insulated and connected to the individual components of the compensator. These internal connections of the cable 32 may take any conventional form and are therefore not shown in the drawing.

In addition, nipple 30, which is either part of base plate 12, or attached thereto by means of a sealed screw-in coupling, abuts against a tube 30′, attached to the base plate 1 of the mechanical meter movement and traversed by cable 32.

To balance out thermal effects, which cause changes in the pressure difference between the interior of housing 11, 12 and pressure chamber 5, the pressure chamber is placed in pressure-communicating relation with the interior of housing 11, 12 by means of a bellows 14 which exerts at most a weak flexure-opposing force. The end plate of bellows 14 is connected to a push-rod 15′ which is similar to push-rod 15 attached to bellows 28 and which acts on lever 18 on the opposite side of its fulcrum 17 from push-rod 15. In this way changes in pressure difference between the two spaces exert no effect on lever 18 via bellows 28, but are balanced out due to the fact that such changes produce equal changes in bellows 28 and 14, and therefore equal displacements of push-rods 15 and 15′ in the same direction. Since these push-rods bear on lever 18 on opposite sides of its fulcrum 17, the net effect of these push-rod displacements on the lever 18 is nil. On the other hand, displacements of push-rod 15 under the influence of movements of rod 9′ will act on one side of lever 18 only. However, the resultant displacement of the lever will be transmitted in opposite sense to the other side of the lever and will therefore produce a displacement of push-rod 15′ equal and opposite to that of push-rod 15. This in turn will cause a contraction or expansion of bellows 14 which is the inverse of that of bellows 28. This relieves pressure changes inside housing 11, 12 which would otherwise affect the measurement, as previously explained.

Housing 11, 12 is demountably attached to base plate 1 by means of plural posts 29.

A spring 33 exerts on bellows 8 a force which is adjustable by means of control knob 34 inserted in pressure-tight fashion into cap 2. This control knob 34 serves to adjust the force transmission from rod 9 to the meter movement 21 of the electro-mechanical compensator.

The bellows 14 and 28 are again guided as the bellows 8 and 8'. The rods 15 and 15' are connected by a weak leaf spring or membrane which is fastened by screws to plate 12. A leaf spring or membrane connects in the same manner the heads of bellows 14 and 28. This spring is in the same manner as described fastened to plate 12. Both springs do not disturb the possibility of individual free movement of the two bellows but provide a parallel guide only.

It is apparent that the electro-mechanical compensator portion, which is enclosed within housing 11, 12, can be used with any kind of mechanical differential-pressure measuring means. In all such applications of the invention the housing of the electro-mechanical compensator is preferably placed in the low-pressure side of the differential-pressure measuring means.

We claim:

1. An electrical differential-pressure measuring system comprising a mechanical differential-pressure measuring device having two pressure chambers separated by a partition displaceable in response to the pressure difference between said chambers, and comprising further an electro-mechanical force compensator for transferring a force corresponding to a pressure difference into an electrical quantity, said compensator having a displaceably mounted meter element, means for transferring said force to said element, means for electrically connecting resultant displacements of said element, means for producing an electrical current in response to said detected displacement, and electro-magnetic force productive means responsive to said current to develop a compensating force opposing said first-mentioned force acting on said element, said system being characterized in that:
    (a) said meter element, detecting means, and compensating force productive means of said electro-mechanical compensator are all located inside a housing filled with a protective liquid;
    (b) said housing is demountably attached to said differential-pressure measuring device;
    (c) said liquid filling said compensator housing is subjected to the pressure inside one of said pressure chambers by means of a flexible wall in said housing establishing a pressure-communicative relationship between the interior of said housing and said one pressure chamber, said flexible wall exerted at most a weak flexible-opposing force;
    (d) said force corresponding to said pressure difference produced by said differential-pressure measuring device is transferred from the interior of said one pressure chamber to said meter element inside said compensator housing by means of an elastic, through-the-wall coupling in said housing, said coupling exerting at most a weak flexure-opposing force, mechanical coupling elements inside said pressure chamber and inside said housing being placed in force-communicating relation with each other by said coupling;
    (e) said mechanical coupling elements inside said housing comprising a rotatable lever to which said first-mentioned force transferred by means of said elastic through-the-wall coupling is applied to a rotatable lever; and
    (f) said housing wall also contains a second coupling similar to said first-mentioned coupling, by means of which a force corresponding to any pressure difference between said housing interior and said one pressure chamber is applied to said last-named lever in a differential-pressure compensating sense.

2. The system of claim 1 further comprising a base plate closing off both said pressure chambers, said base plate containing elastic means separating said chambers and sensing the differential-pressure in said chambers, said base plate also having attached to opposite sides thereof domes whose interiors communicate via passages with pressure take-off ports, and said electro-mechanical compensator being demountably attached to said base plate within one of said domes.

3. The system of claim 1 further characterized in that said compensator housing is located entirely inside one of said pressure chambers and in that said flexible wall and said elastic coupling are located at opposite ends of said compensator housing.

4. The system of claim 3 further characterized in that said pressure chambers together form a generally cylindrical enclosure, said compensator housing being located within said one pressure chamber generally in line with the axis of said cylindrical enclosure.

5. The system of claim 4 further characterized in that said housing is supported within said one chamber by attachment to said portion separating said pressure chambers.

6. A system for measuring the difference between the pressures of a fluid at different locations, said system comprising:
    an enclosure divided into two chambers by a partition and a pressure-responsive separating means, said chambers being adapted to be supplied with said fluid at said respective pressures and said separating means being responsive to said fluid to produce a force acting in a given direction and corresponding to said difference;
    a housing filled with a protective liquid and demountably attached to said partition, externally of said separating means, said liquid being subjected to the pressure in one of said chambers via a flexible diaphragm exerting at most a weak flexure-opposing force;
    a meter element displaceable in response to an applied force;
    means for electrically detecting displacements of said element;
    means responsive to said detection to produce a force compensating said applied force, said meter element, detecting means and detection responsive means being all enclosed in said housing;
    and means for applying said force produced by said separating means to said meter element, said applying means comprising linkages within said housing and a coupling through the wall of said housing between said linkages and said separating means, said coupling being elastic in said given direction only.

7. The system of claim 6 further characterized in that said coupling comprises a rod aligned with said given direction and a bellows sealing said rod to said housing; and means restraining said rod and bellows against displacement in any direction transverse to said given direction.

8. A system for measuring the difference between the pressures of a fluid at different locations, said system comprising:
    an enclosure divided into two chambers by a partition and a pressure-responsive separating means, said chambers being adapted to be supplied with said fluid at said respective pressures and said separating means being responsive to said fluid to produce a force acting in a given direction and corresponding to said difference;
    a housing filled with a protective liquid and demountably attached to said partition externally of said separating means, said liquid being subjected to the pressure in one of said chambers via a flexible diaphragm exerting at most a weak flexure-opposing force;
    a meter element displaceable in response to an applied force;
    means for electrically detecting displacements of said element;
    means responsive to said detection to produce a force compensating said applied force, said meter element, detecting means and detection responsive means being all enclosed in said housing;

means for applying said force produced by said separating means to said meter element, said applying means comprising linkages within said housing and a coupling through the wall of said housing between said linkages and said separating means, said coupling comprising rod aligned with said given direction and a bellows sealing said rod to said housing;

means restraining said rod and bellows against displacement in any direction transverse to said given direction;

and a second coupling through the wall of said housing, said second coupling comprising a second rod, substantially parallel to said first-mentioned rod and a second bellows sealing said second rod to said housing, said second rod being coupled to said linkages so as to counteract forces applied to said linkages by said first-mentioned rod in response to changes in the volume of said protective liquid.

9. The system of claim 8 further characterized in that said second rod and bellows are coupled to said first-mentioned rod and bellows so that contractions and expansions of said first-mentioned bellows in response to said force produced by said separating means are inversely reproduced by said second bellows.

References Cited by the Examiner

UNITED STATES PATENTS 2,659,390 11/53 MacLea et al. _____ 73—398 X
2,949,775 8/60 Newbold _____ 73—398 X LOUIS R. PRINCE, *Primary Examiner.*

ROBERT EVANS, RICHARD C. QUEISSER,
*Examiners.*